United States Patent [19]

Ramaswamy et al.

[11] 3,768,021

[45] Oct. 23, 1973

[54] NOISE SQUELCH CIRCUIT FOR POWER LINE CARRIER SYSTEMS

[75] Inventors: Ramanathan Ramaswamy; Johannes J. Vandegraaf, both of Lynchburg, Va.

[73] Assignee: General Electric Company, Lynchburg, Va.

[22] Filed: Jan. 24, 1972

[21] Appl. No.: 219,950

[52] U.S. Cl. .......... 325/478, 179/15 BP, 179/15 BT, 325/348, 325/392, 325/476

[51] Int. Cl. .......... H04b 1/10

[58] Field of Search .......... 325/478, 473, 474, 325/476, 480, 348, 323, 324, 64, 392, 466; 179/15 BT, 15 BP

[56] References Cited

UNITED STATES PATENTS 3,320,535 5/1967 Broadhead, Jr. .......... 325/64
3,397,401 8/1968 Winterbottom .......... 325/64
3,084,328 4/1963 Groeneveld et al. .......... 325/478

*Primary Examiner*—Howard W. Britton
*Assistant Examiner*—Marc E. Bookbinder
*Attorney*—James J. Williams et al.

[57] ABSTRACT

In a power line carrier receiver for a band of high-frequency carrier signals that are amplitude-modulated with information signals, a narrow-band pilot signal and attendant noise, both in the band of high-frequency carrier signals, are used to provide a squelch signal. The pilot signal is detected and integrated, and the integrated signals that exceed a selected direct current magnitude are used to produce a trigger signal. The trigger signal is used to block the information-carrying high-frequency carrier signals, and thus provide noise squelch.

3 Claims, 2 Drawing Figures

NOISE SQUELCH CIRCUIT FOR POWER LINE CARRIER SYSTEMS

BACKGROUND OF THE INVENTION

Our invention relates to a noise squelch circuit, and particularly to a noise squelch circuit for use in a power line carrier receiver.

Power line carrier systems are used by power companies to provide relatively economical communication, telemetering, and control channels over existing 60-cycle power transmission lines. Two obvious advantages of such carrier systems are that the transmission lines are already in place between locations where the channels are needed, and that the carrier system requires only the addition of the carrier equipment. However, because the transmission lines are long and exposed to many intensive noise sources, the channels are frequently very noisy.

Accordingly, an object of our invention is to provide a new and improved noise squelch circuit for power line carrier systems using amplitude modulation.

Another object of our invention is to provide a new and improved power line carrier system squelch circuit that operates on the noise in a carrier pilot signal which is typically provided and used in the power line carrier system.

SUMMARY OF THE INVENTION

Briefly, these and other objects are achieved in accordance with our invention by detecting the pilot signal and attendant noise, and integrating the detected signal. The integrated signal is applied to a trigger circuit which provides a fast-rising signal in response to integrated signals that exceed a selected direct current magnitude (hence indicating excessive noise levels). This fast-rising signal is used to block the channel signals in a carrier band and, hence, provides squelch under noisy conditions. As soon as the integrated signal falls below the selected direct current magnitude (hence indicating an acceptable noise level), the trigger circuit provides a fast-falling signal so that the channel signals in the carrier band are passed and utilized.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF THE PREFERRED EMBODIMENT

Figure 1:
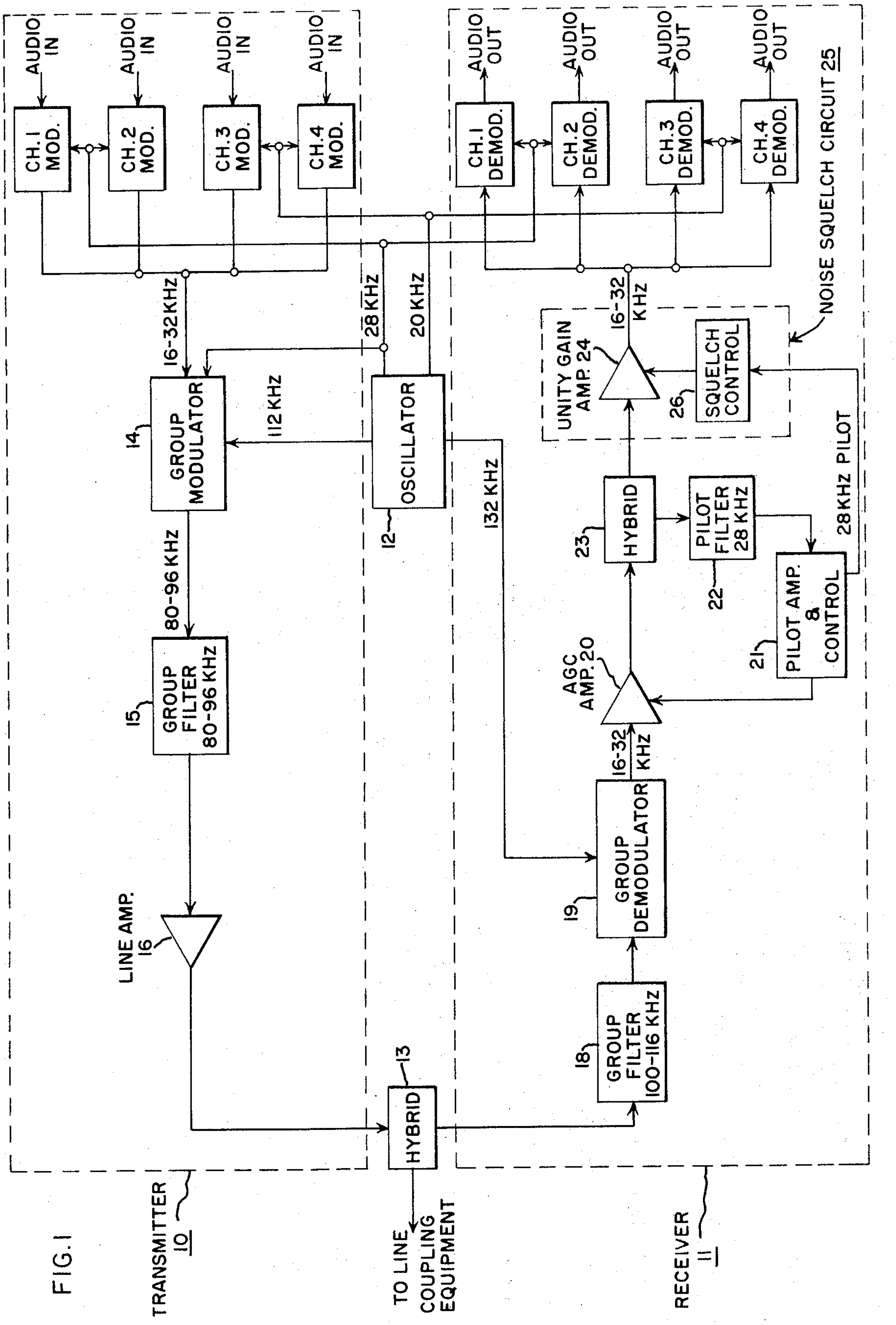
FIG. 1 shows a block diagram of one end of a typical power line carrier system having a transmitter, and having a receiver provided with a noise squelch circuit in accordance with our invention.

FIG. 1 shows one end of a power line carrier system that we have assumed provides four voice frequency or audio frequency information channels, each having a bandwidth of four kilohertz (kHz). The system comprises a transmitter 10 and a receiver 11 (which are shown enclosed in respective dashed lines); and also comprises a common oscillator 12, and a common hybrid 13 which couples the transmitter 10 and the receiver 11 to line coupling equipment. The line coupling equipment is not shown, but typically includes a high voltage capacitor having a low impedance to the carrier frequencies and a high impedance to the 60-cycle power frequency. We have also assumed that the system transmits the four information channels in a carrier frequency band between 80 and 96 kHz, and receives four information channels in a carrier frequency band between 100 and 116 kHz. In order to provide these frequencies, the oscillator 12 supplies channel modulating and demodulating frequencies of 20 and 28 kHz to both the transmitter 10 and the receiver 11; a group modulating frequency of 112 kHz to the transmitter 10; and a group demodulating frequency of 132 kHz to the receiver 11. In the transmitter 10, the four audio or voice frequency signals (up to 4 kHz) are applied to respective channel modulators. The 28 kHz signal is used for channels 1 and 2 to be modulated by the audio frequencies and converted to single sideband, amplitude-modulated signals between 28 and 32 kHz and between 24 and 28 kHz, respectively. Similarly, the 20 kHz signal is used for channels 3 and 4 to be modulated by the audio frequencies and converted to single sideband, amplitude modulated signals between 16 and 20 kHz and between 20 and 24 kHz, respectively. This band of frequencies between 16 and 32 kHz is applied to a group modulator 14, along with a pilot frequency of 28 kHz. This pilot frequency is used at a distant receiver to provide various functions. The group modulator 14 is supplied with a 112 kHz signal to convert the band of frequencies between 16 and 32 kHz to a band of frequencies between 80 and 96 kHz. This band of frequencies is applied to a group filter 15 which rejects frequencies outside this band. The band of frequencies is applied to a line amplifier 16 which provides a suitable power level output for application to the hybrid 13. These frequencies are transmitted to a distant receiver over the line coupling equipment and the transmission lines.

In the receiver 11, single sideband signals from the distant transmitter are received in the hybrid 13 and applied to a group filter 18 which, for this system, passes frequencies in the band between 100 and 116 kHz, and rejects other frequencies. This band of frequencies is applied to a group demodulator 19 with a 132 kHz signal from the oscillator 12 which converts the frequencies to a band between 16 and 32 kHz. This band of frequencies is applied to an automatic gain control (AGC) amplifier 20. The output level of the ACG amplifier 20 is determined by a pilot amplifier and control circuit 21 which, in turn, is controlled by the level of the received 28 kHz pilot frequency. The pilot frequency is present in the band of frequencies received, and is derived by a hybrid 23 (coupled to the output of the AGC amplifier 20) and by a pilot filter 22. Thus, a closed loop AGC circuit is provided. The pilot filter 22 is a fairly narrowband filter, passing frequencies between 27.9 and 28.1 kHz for example. The band of frequencies between 16 and 32 kHz carrying information is supplied by the hybrid 23 to a unity gain amplifier 24, which is provided in our noise squelch circuit 25 as will be explained. The frequencies from the amplifier 24 are applied to the four channel demodulators along with the demodulating frequencies from the ocsillator 12. Audio or voice frequencies (up to 4 kHz) for channels 1 and 2 are produced by the 28 kHz frequency, and audio or voice frequencies (up to 4 kHz) for channels 3 and 4 are produced by the 20 kHz frequency.

The system shown in FIg. 1 and just described operates with a substantially similar system at some remote location. The principal difference is that the oscillator at the remote location supplies a frequency of 112 kHz to the receiver and a frequency of 132 kHz to the transmitter so as to provide proper and corresponding operation with the system shown in FIG. 1. Such systems as described are familiar and well-known in the art. Hence, no further description is believed necessary.

We have found that 60-cycle power transmission lines are subjected to extensive noise, because of their length and exposure to noise at the carrier frequencies. Consequently, the information channels provided by the carrier systems using such lines are frequently noisy. It is, therefore, desirable to provide a noise squelch circuit in order to stop transmission when the noise level exceeds some unacceptable or intolerably high level. Accordingly, we have provided the noise squelch circuit 25 shown in the receiver 11. In this squelch circuit 25, we have inserted the unity gain amplifier 24 between the hybrid 23 and the four-channel deomdulator to provide means for passing or blocking the band of frequencies between 16 and 32 kHz. The amplifier 24 normally passes signals, but, in response to a signal from a squelch control circuit 26, blocks these frequencies. Our squelch control circuit 26 operates from the pilot frequency which, in the example shown in FIG. 1, is assumed to be 28 kHz, and which is normally available in amplified form from the pilot amplifier and control circuit 21. However, the 28 kHz pilot frequency can be derived from other points in the receiver 11. Briefly, our squelch circuit 25 detects the 28 kHz pilot frequency and its attendant noise frequencies (such as 100 Hertz on each side of the 28 kHz pilot frequency), and compares the detected signal with a reference. If the detected noise level exceeds the reference, the squelch control circuit 26 blocks the unity gain amplifier 24.

Figure 2:
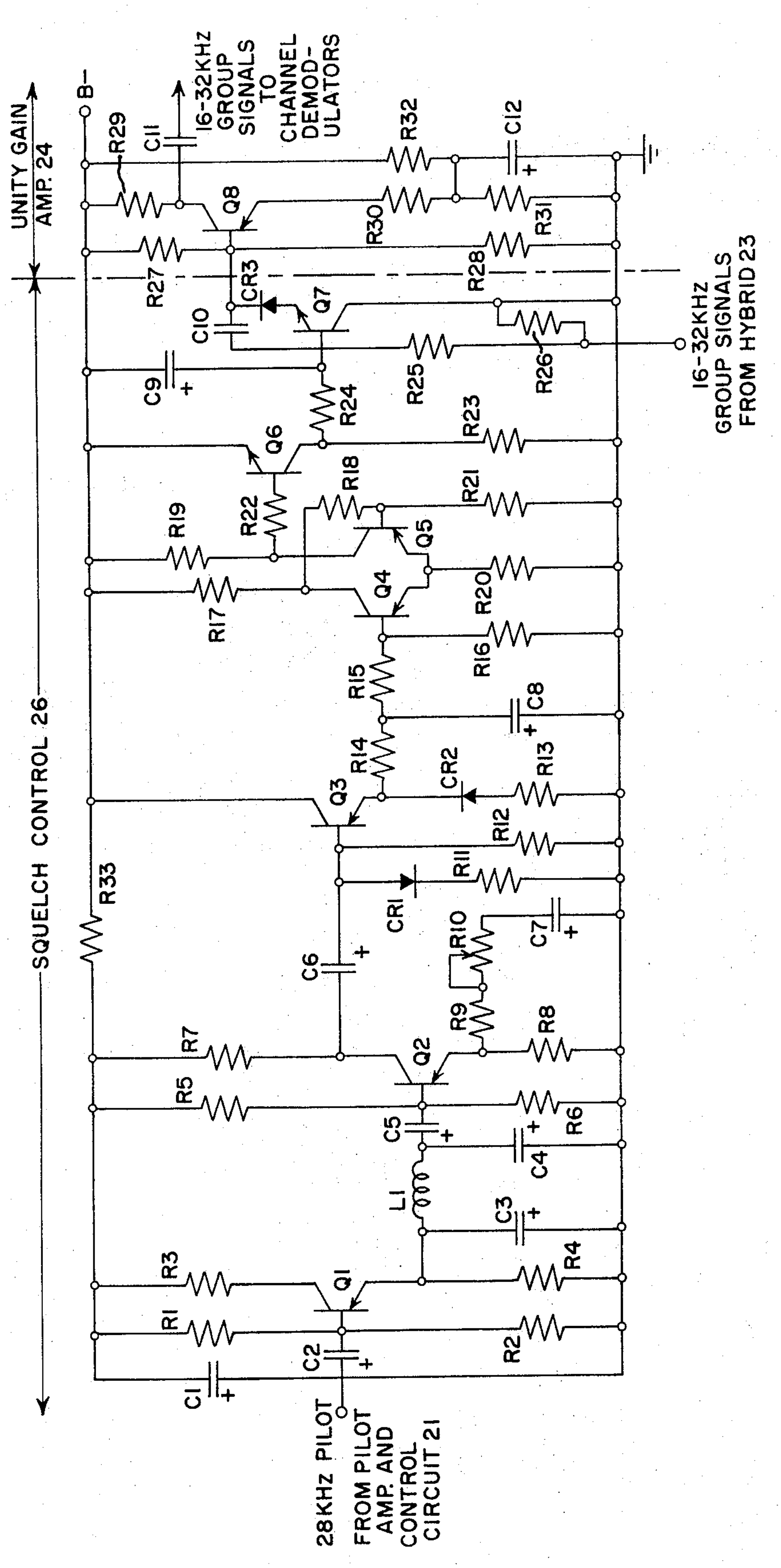
FIG. 2 shows a schematic diagram of a noise squelch circuit in accordance with a preferred embodiment of our invention.

FIG. 2 shows a preferred schematic diagram of our noise squelch circuit 25. This noise squelch circuit 25 is provided with a suitable source of operating potential, in this case a direct current voltage B−, that is negative with respect to ground. This operating potential can be obtained from the power supply in the system of FIG. 1. The 28 kHz pilot frequency (and any attendant noise in the frequency range passed by the filter 22) is capacitively coupled to an envelope detector transistor Q1. Detected signals are derived at the emitter of the transistor Q1 and coupled through a low-frequency bandpass filter, comprising the inductor L1 and the capacitors C3, C4, C5, to a variable gain amplifier transistor Q2. (The bandpass of this filter is not critical, as long as the detected noise frequencies are passed and the pilot frequency is rejected). The gain of the transistor Q2 is determined by the setting of the movable contact on an emitter-resistor R10. This setting determines the noise level (and hence the signal-to-noise ratio) at which our squelch circuit operates. Signals are derived from the collector of the transistor Q2 and applied to an emitter-follower transistor Q3. Signals at the emitter of the transistor Q3 are integrated (i.e., changed to a slowly varying, negative direct current voltage) by integrating resistors R13, R14, and an integrating capacitor C8. This integrated signal is applied to a Schmitt trigger circuit comprising two transistors Q4, Q5. As known, when transistor Q4 is turned on, transistor Q5 is turned off rapdily; and when transistor Q4 is turned off, transistor Q5 is turned on rapidly. The output from the Schmitt trigger circuit is derived at the collector of the transistor Q5 and applied to a transistor Q6. The transistor Q6 amplifies the trigger signals and applies them to a control transistor Q7. The emitter of the transistor Q7 is coupled through a rectifier CR3 to the base of the unity gain amplifier transistor Q8.

The unity gain amplifier transistor Q8 also receives the signals in the frequency range between 16 and 32 kHz from the hybrid 23. These signals are coupled through a capacitor C10 to the base of the transistor Q8. Hence, when the transistor Q7 is turned off, these signals from the hybrid 23 pass through the transistor Q8, and are derived at the collector of the transistor Q8 and coupled through a capacitor C11 to the channel demodulators. However, when the transistor Q7 is turned on, the voltage on the base of the transistor Q8 rises almost to zero so that the transistor Q8 does not pass signals. Hence, noise squelch is provided in the unity gain amplifier transistor Q8.

In the operation of our squelch circuit, the transistors Q1, Q2, Q3 are constantly detecting the noise frequencies passed by the pilot filter 28, and integrating the signals passed by the low-frequency bandpass filter (L1, C3, C4, C5). When there is relatively little noise, the signal amplitude at the base of the transistor Q3 is relatively small. Hence, the integrated signal applied to the base of the trigger transistor Q4 does not have a very negative voltage magnitude so that the transistor Q4 is turned off. This is the normal condition. The transistor Q5 is turned on, and this turns the transistor Q6 on and the transistor Q7 off. With the transistor Q7 off, the base of the unity gain amplifier transistor Q8 is left at the voltage level where group frequencies from the hybrid 23 are passed to the channel demodulators. If, however, there is a relatively large amount of noise, the signal amplitude at the base of the transistor Q3 is relatively large. Hence, the integrated signal applied to the base of the trigger transistor Q4 has a relatively large negative voltage magnitude so that the transistor Q4 is turned on. When this occurs, the transistor Q5 is turned off very rapidly or quickly. This is the triggered condition. When the transistor Q5 is turned off, this causes the transistor Q6 to be turned off. This, in turn, causes the transistor Q7 to be turned on. Hence, the voltage on the base of the unity gain transistor Q8 rises (actually becomes less negative) so that the transistor Q8 cannot conduct and pass group frequenices. When the noise level falls back below the selected magnitude, the circuit switches to its original condition with the transistor Q7 turned off so that the transistor Q8 passes frequencies.

The circuit of FIG. 2 was constructed with the following specifications:

| | | |
|---|---|---|
| | | volts |
| Voltage B− | | 36 |
| | | microfarads |
| Capacitors: | C1 | 15 |
| | C2 | 22 |
| | C3 | 6.8 |
| | C4 | 15 |
| | C5 | 6.8 |
| | C6 | 6.8 |
| | C7 | 100 |
| | C8 | 100 |

| | |
|---|---|
| C9 | 3.9 |
| C10 | 0.22 |
| C11 | 0.22 |
| C12 | 2.2 |
| | ohms |
| Resistors: R1 | 68,100 |
| R2 | 5,100 |
| R3 | 10 |
| R4 | 510 |
| R5 | 100,000 |
| R6 | 11,000 |
| R7 | 12,000 |
| R8 | 2,200 |
| R9 | 10 |
| R10 | 2,500 |
| R11 | 100 |
| R12 | 56,000 |
| R13 | 10,000 |
| R14 | 10,000 |
| R15 | 20,000 |
| R16 | 75,000 |
| R17 | 4,700 |
| R18 | 26,100 |
| R19 | 3,160 |
| R20 | 1,500 |
| R21 | 7,500 |
| R22 | 4,700 |
| R23 | 5,600 |
| R24 | 1,000 |
| R25 | 2,000 |
| R26 | 150 |
| R27 | 30,000 |
| R28 | 7,500 |
| R29 | 1,960 |
| R30 | 82,500 |
| R31 | 316 |
| R32 | 5,600 |
| R33 | 51 |
| Inductor L1 | 1 henry |
| Transistors Q1, Q2, Q3, Q4, Q5, Q8 | Type 2N2800 |
| Transistors Q6, Q7 | Type 2N3053 |

In this circuit, the capacitor C9 and the resistors R24, R23 had a time constant of approximately 26 milliseconds. This time constant sets the time which elapses between the receipt of high level signals or noise and squelching action, thus reducing the response to transients. This time constant can be varied, although the time provided by our actual circuit provided good operation under typical conditions. The filter comprising the inductor L1 and the capacitors C3, C4, C5 passed detected noise signals between approximately 3 and 80 Hz, but this frequency band can be changed so that other noise frequencies can be used to provide squelch.

It will thus be seen that we have provided a new and improved power line carrier system having a squelch circuit to eliminate the undesirable effects of noise to which most power transmission lines are subjected. The signal-to-noise ratio at which squelch is provided depends upon the gain of the transistor Q2. Higher gain (and hence squelch even for low amplitude noise) is provided by reducing the magnitude of the resistor R10. Lower gain (and hence squelch only for high amplitude noise) is provided by increasing the magnitude of the resistor R10. The range of the resistor R10 given in the table above provides squelch for signal to noise ratios between 0 db (when the resistor R10 presents 2,500 ohms) and 30 db (when the resistor R10 presents zero ohms). Since our circuit operates on the amplitude of noise signal detected from the carrier frequencies, it is independent of pilot levels and more responsive to true noise conditions. While we have shown only one embodiment, persons skilled in the art will appreciate that modifications may be made. For example, various frequency bands may be used to operate our squelch circuit. The pilot frequency may be derived at other locations, such as between the group filter 18 and the group demodulator 19. However, such a derivation would require a special filter, and we prefer to utilize the pilot frequency at the location shown. Other trigger circuits may be used. And the voltages needed to trigger the squelch on and off can be selected (i.e., made the same, or nearly the same, or quite different) to meet any particular operating condition. The unity gain amplifier which passes or blocks the group frequencies may be located at other points in the circuit, such as between the AGC amplifier 20 and the hybrid 23. However, we prefer the location shown in the FIG. 1, since the pilot frequency has passed through the automatic gain control circuit. Therefore, while our invention has been described with reference to a particular embodiment, it is to be understood that modifications may be made without departing from the spirit of the invention or from the scope of the claims.

What we claim as new and desire to secure by Letters Patent of the United States is:

1. In a power line carrier receiver for receiving a band of information carrier frequencies and a pilot frequency located within said band of carrier frequencies, an improved noise squelch circuit comprising:

a. an input terminal to which said band of information carrier frequecies and said pilot frequency are applied;

b. a controlled amplifier connected to said input terminal for amplifying said band of information carrier frequencies;

c. a narrow band filter connected to said input terminal for deriving said pilot frequency and a relatively narrow band of noise frequencies adjacent thereto;

d. an envelope detector connected to said narrow band filter for detecting noise frequencies passed by said narrow band filter;

e. an integrator connected to said envelope detector for producing a slowly varying direct current voltage in response to detected noise frequencies;

f. a trigger circuit connected to said integrator, said trigger circuit having a normal condition that switches to a triggered condition in response to signals from said integrator that exceed a selected magnitude;

g. and a control circuit connected between said trigger circuit and said controlled amplifier for permitting said controlled amplifier to pass said band of information carrier frequencies in response to said normal condition of said trigger circuit, and for preventing said controlled amplifier from passing said band of information carrier frequencies in response to said triggered condition of said trigger circuit.

2. The improved noise squelch circuit of claim 1, and further comprising a time delay circuit connected between said trigger circuit and said control circuit for reducing the effect of transient signals.

3. The improved noise squelch circuit of claim 1, and further comprisng a time delay circuit connected between said trigger circuit and said control circuit for reducing the effect of transient signals, and a low frequency, bandpass filter connected between said envelope detector and said integrator.

* * * * *

UNITED STATES PATENT OFFICE
CERTIFICATE OF CORRECTION

Patent No. 3,768,021 Dated October 23, 1973

Inventor(s) Ramanathan Ramaswamy, Johannes J. Vandegraaf

It is certified that error appears in the above-identified patent and that said Letters Patent are hereby corrected as shown below:

| | |
|---|---|
| Column 2, line 53 | cancel "ACG" and insert -- AGC -- |
| Column 3, line 6 | cancel "FIg." and insert -- FIG. -- |
| line 27 | cancel "deomdulator" and insert -- demodulator -- |
| Column 4, line 5 | cancel "rapdily" and insert -- rapidly -- |
| Column 5, line 58 | cancel "signal" and insert -- signals -- |
| Claim 1, line 26 | cancel "frequecies" and insert -- frequencies -- |
| Claim 3, line 59 | cancel "comprisng" and insert -- comprising -- |

Signed and sealed this 9th day of April 1974.

(SEAL)
Attest:

EDWARD M.FLETCHER,JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334